United States Patent
Bulman

(10) Patent No.: US 6,351,265 B1
(45) Date of Patent: Feb. 26, 2002

(54) METHOD AND APPARATUS FOR PRODUCING AN ELECTRONIC IMAGE

(75) Inventor: Richard L. Bulman, New York, NY (US)

(73) Assignee: Personalized Online Photo LLC, New York, NY (US)

(*) Notice: Subject to any disclaimer, the term of this patent is extended or adjusted under 35 U.S.C. 154(b) by 0 days.

(21) Appl. No.: 09/300,987

(22) Filed: Apr. 28, 1999

Related U.S. Application Data

(63) Continuation of application No. 08/840,486, filed on Apr. 21, 1997, which is a continuation-in-part of application No. 08/489,564, filed on Jun. 12, 1995, now Pat. No. 5,623,587, which is a continuation-in-part of application No. 08/138,531, filed on Oct. 15, 1993, now abandoned.

(51) Int. Cl.[7] .............................................. G06F 15/00
(52) U.S. Cl. ...................................................... 345/435
(58) Field of Search ................................. 345/435, 433, 345/473, 474, 113, 114

(56) References Cited

U.S. PATENT DOCUMENTS 4,645,459 A * 2/1987 Graf et al. .................. 345/435
5,623,587 A * 4/1997 Bulman ....................... 345/435

* cited by examiner

*Primary Examiner*—Phu K. Nguyen
(74) *Attorney, Agent, or Firm*—Milde, Hoffberg & Macklin, LLP

(57) ABSTRACT

A method of providing normalized images, comprising the steps of:
  (a) receiving an electronic representation of an image including a head;
  (b) extracting the head from the image;
  (c) determining a size of the head;
  (d) rescaling the head to a plurality of desired sizes; and
  (e) outputting the plurality of rescaled heads as printed images on a medium.

27 Claims, 14 Drawing Sheets

METHOD AND APPARATUS FOR PRODUCING AN ELECTRONIC IMAGE

REFERENCE TO RELATED APPLICATIONS

The present application is a continuation of U.S. patent application Ser. No. 08/840,486 filed Apr. 21, 1997, now abandoned which is a Continuation-in-part of 08/489,564, filed Jun. 12, 1995, now U.S. Pat. No. 5,623,587 each of which is expressly incorporated herein by reference.

BACKGROUND OF THE INVENTION

The present invention relates to a method and apparatus for producing an image of a head, corresponding to a body image from another source, so that a resulting composite image has a natural orientation and size.

In the following description, the term "head" is intended to include not only the head of a human being with its hair (however long) face, ears, etc., but also any and all appurtenant accessories such as a hat, glasses, hair adornments, jewelry (earrings, etc.) and the like. The term "body" as it is used herein, is intended to include the body of a human being, animal, fish, etc., (either real or fictional) including not only the torso, arms, legs, tail, fins, etc., but also any and ail appurtenant clothing, shoes, jewelry, and the like. The "body" may also be another environment in which an image of a head is appropriate, such as a window, television screen or portal. The image of the head and/or body may be obtained from a "real" head or body, respectively, either photographically or by electronic image scanning, or from an artistic or computer generated rendering thereof It is known to produce pictures of human subjects with the head of one human being superimposed upon the body of another human being, animal, fish, etc. This superposition is normally accomplished "mechanically" by cutting around the outline of the head of a person shown in a first photograph and applying this head, in the proper position and orientation, to a body in a second photograph. The resulting "mechanical" is thereafter photographed and/or scanned electronically to produce a third photograph or electronic image. Electronic implementation of this process is also known, where the head is electronically traced and superimposed.

This superposition process is time consuming and requires that the head and body in the first and second photographs, respectively, be adjusted in scale photographically; that is, that either the first or second photograph be enlarged or reduced so that the head and body are of the same relative size.

Consequently, this superposition process is only rarely used, and when used it is limited to situations where the cost of the process is small compared to the cost of the overall desired product.

It is also known to scan photographs electronically, which may be used to produce customized portraits on self-adhesive paper labels. It is also known to print a plurality of portrait photographs in a variety of sizes on photographic paper.

SUMMARY OF THE INVENTION

It is a principal object of the present invention to provide a method and apparatus for producing an output image including a size-normalized image of a digital image of an object. The object is generally an anatomical portion of a subject, such as a human or animal.

It is also an object according to the present invention to provide a method of producing an electronic image of a human subject, said method comprising the steps of:

(a) providing an electronic representation of an image of a head of said subject;

(b) providing an image containing a body corresponding to said head;

(c) producing a set of digital representations defining an actual size of said head in said electronic representation;

(d) providing a set of digital representations defining a desired size of said head corresponding to said body;

(e) processing said electronic representation of said image of said head in dependence upon the size information defined by said actual size and said desired size, representing said head scaled to said desired size; and (f) outputting said processed electronic representation as an image of said head scaled to said desired size.

Advantageously, the method includes the further step of superimposing said outputted electronic representation of said head scaled to said desired size on said body. The image of the head may be, for example, a photograph, electronic still image, video image or a series of photographs. Non-electronic image media may be scanned or otherwise digitized for input. The head may be an artistic rendering, or a synthesized or actual image of a head. Likewise, the image containing the body may be an artistic rendering, or a synthesized or actual image of the body. The head and body images need not be of the same type, and advantageously, a processing step may be performed to modify either the head image, body image, or both, to increase a matching between the two. The images are preferably in natural colors; however, monochrome images, false colors, discrete color space images, cartoon images and the like may also be employed.

According to another object of the invention, the head has a reference vector and said body has a reference vector, wherein the head and body are combined to obtain a predetermined relationship of the reference vectors of said head and said body. These vectors may be a point; origin and magnitude; origin, magnitude and orientation, or include other information, and the vector space for the head need not be identical to the vector space for the body. Therefore, the combining step may include a processing of one image portion to correspond to another image portion. Likewise, the vector space may also include a set of varying or incrementally varying images, wherein the processing includes the step of selecting one of the images or synthesizing a new image from the set of images. For example, the image of the head may include a plurality of head images incrementally varying in rotation about a vertical axis, wherein the vector matching comprises selection of the head image having an appropriate angle for the body image.

In one embodiment, the reference point on the head is on the chin.

According to a still further object of the invention, the method may further include the steps of:

(g) providing a second image containing a second body corresponding to said head;

(h) providing a second set of digital representations defining a second desired size of said head corresponding to said body of said second image;

(i) processing said electronic representation of said image of said head in dependence upon the size information defined by said actual size and said second desired size, representing said head scaled to said second desired size; and (j) outputting said processed electronic representation as an image of said head scaled to said second desired size.

It is a further object of the present invention to produce a reproduction of the combined image on a recording medium, which may be a printing medium or an electronic storage medium.

In order to facilitate alignment of the head and body, and relax the necessary tolerances for an aesthetically pleasing result, a collar may be provided on the body immediately adjacent to a location of said superimposed head. Alternately, a neck portion may be provided on the head, with a reference point on the neck. A soft pink border may be provided around the head.

According to a still further object of the invention, the images may be associated with audio information, such as spoken words. These words may include, for example, the name of the person whose head is included in the image.

According to another object of the invention, a plurality of desired head sizes are provided, and a plurality of heads are each processed and scaled to a different given size, and then the plurality of scaled heads are output.

It is also an object of the invention to provide aethod of producing a composite electronic image of a subject comprising the steps of:

(a) obtaining first image information relating to a first anatomical portion of a subject and producing a set of first representations of the first image;

(b) producing a set of size representations associated with the first image information defining a size of the first anatomical portion;

(c) providing a normalized size parameter;

(d) converting the set of first representations of the first image into a set of second representations, in dependence upon the normalized size parameter, the set of second representations defining the first anatomical portion scaled to the desired size; and (e) outputting the second representations as image data.

The method may further comprise the steps of providing a plurality of desired anatomical portion sizes, and converting a plurality of anatomical portions, each of said anatomical portions being scaled to a different given size; and outputting said plurality of scale anatomical portions.

Another object of the invention is to provide a method of providing normalized images, comprising the steps of:

(a) receiving an electronic representation of an image including a head;

(b) extracting the head from the image;

(c) determining a size of the head;

(d) rescaling the head to a plurality of desired sizes; and (e) outputting the plurality of rescaled heads as printed images on a medium.

A further object of the invention is to provide a method of providing a normalized image, comprising:

(a) receiving an electronic representation of an image;

(b) extracting an object from the image;

(c) determining a size of the object;

(d) rescaling the object to a desired size;

(e) electronically outputting an image of the object onto a plastic sheet having self-adhesion properties substantially without adhesive; and (f) separating a portion of the plastic sheet having the output image of the object from a remainder of the sheet. The plastic sheet may be die-cut prior to forming the image thereon.

In a preferred embodiment, the output includes a series of portrait images including an image of a head extracted from its native background in a digital image of a subject, scaled to at least two sizes, which are then printed on a recording medium, such as paper, die-cut labels, plastic film, or the like. For example, the printed images may then be separated from the remainder of the recording medium, and then be superimposed upon a printed page having the body of another subject, which may be a person, animal, fish, etc.

It is a further object of the present invention to provide a method and apparatus for producing an image of the above-noted type which is substantially less time consuming and less costly than the superposition process known heretofore.

These objects, as well as further objects which will become apparent from the discussion that follows, are achieved, in accordance with the present invention, by a method, and by apparatus for carrying out a method, which comprises the steps of:

(a) obtaining first image information relating to a an anatomical portion of a subject and producing a set of first representations of the first image;

(b) producing a set of second representations associated with the first image information defining a size of the anatomical portion of the first image information;

(c) electronically separating the anatomical portion of the first image information from a remainder of the first image information;

(c) optionally processing the anatomical portion image information alter an appearance of the anatomical portion, based on a predetermined criteria;

(d) processing the anatomical portion image information to normalize a size of the anatomical portion according to a predetermined size criteria; and (e) outputting the size-normalized image of the anatomical portion.

In a preferred embodiment, the image is scaled to a plurality of different sizes. The plurality of images may then be output to a single sheet, for example at predetermined locations.

The sheet is preferably a die-cut sheet of self-adhesive labels, such that the normalized size images are printed within the confines of a die-cut sticker, which may, for example, be placed on a sheet in a pre-printed book or pamphlet by an end-user.

The sheet may also be a "sticky" plastic sheet, e.g., polyvinyl chloride, used in such products as the known Colorforms®, which tend to adhere to itself or other surfaces without an adhesive, and can thus be repositioned or removed.

Alternately, the images may be printed directly on a sheet having images of corresponding anatomical portions, so that the printed anatomical portion physiologically joins the preprinted physiological portion. In this case, the printed anatomical portions may be of the same size, although the positioning will generally vary on differing printed sheets.

The optional processing of the anatomical portion may add or alter characteristics based on a morphing, tweening, cartoonization, colorization, recolorization, shading, shadowing, synthetic orientation alteration, or other image processing operation. Various structures may also be appended, grafted or merged onto the anatomical portion, for example to provide various animal features. For example, distinctive ears, nose, hair or the like may be provided in the printed image.

The printed image may also have an associated code indicative of a corresponding image for placement of the body part. This code may be a word, number, color code or other indicia.

In another embodiment, the body part images may be interchangeable for placement with a range of different background images, in the manner of the known "Mad Libs", allowing humorous combinations of foreground and background images. In this case, the various anatomical body part images may be of the same size yet differ in other additions or characteristics, as discussed above.

In another embodiment of the invention, the image of the anatomical portion may be merged with a video stream, wherein the location and scaling of the anatomical portion is selected or controlled so that the anatomical portion corresponds to and follows structures in the video stream. In this case, the video stream may be either a predetermined sequence, allowing the desired locations and scalings to be predetermined, or interactive, in which case the merging process in real time receives the location and/or scaling data corresponding to the video stream, and this data is employed to control the superposition process.

In the preferred embodiment according to the present invention, the anatomical portion is a head and the corresponding anatomical portion is a body, preferably derived from different subjects, i.e., the body is not the body of the subject from which the head is derived. However, it is also possible to merge the body and head of the same subject according to the present invention.

The anatomical image information is generally obtained either through an electronic camera or from scanning one or more still pictures. However, no particular type of image source is required. The corresponding anatomical image, as stated above, may be a preprinted page, still image, or video stream. The corresponding anatomical image may also be an electronic representation of a still or moving image, which allows the composite image to be output electronically as a still or animated image.

The system according to the present invention may be employed to generate a customized video game, wherein an image of a head of a person, e.g., the player, is employed as a "sprite" or translatable icon, within the video output. In accordance with the present invention, the scaling of the image may be controlled, as well as the application of special effects, which may be varied during the course of the video game.

In order to obtain the image of the anatomical portion, a user's local computer or computerized device may be provided with computer software to extract the anatomical portion, or this functionality provided at a central service bureau. While printed sheets and electronic storage media may be physically transported between a service bureau and the end user, advantageously, this image information is communicated electronically, through a direct dial-up link or through a computer network, such as the Internet.

Typically, the corresponding anatomical portion comprises an animated image or image sequence, a videotape, a series of still scenes, or a computer generated background. The corresponding anatomical portion image preferably has an anatomical adjoining part which allows normal appearing placement of the anatomical part of the first image, or includes a buffer zone which obscures misalignment or other visual artifacts from the merging process.

The positioning information preferably comprises a single point, and the size information preferably comprises a single dimension. The image of the anatomical portion, in such a case, is presumed to have a predetermined orientation. The corresponding anatomical portion image is therefore one in which the desired orientation matches that of the anatomical portion image. However, the positioning information may also include a vector defining one or more additional degrees of freedom, the anatomical portion image information comprising information relating to a three or four dimensional representation of the anatomical portion. Thus, the orientation, positioning, scaling, movement, or other characteristics of the anatomical portion may be controlled for a desired composite image. Generally, the purpose of the composite image formation is to customize a generic background image. Thus, the present invention allows the production of customized books, video tapes, video games, instructional or educational presentations, and the like.

The preparation for producing an output image may be a simple discrete superimposition of the anatomical portion image with the corresponding anatomical portion image information, or a more complex process. In a more complex process, the anatomical portion image may interact with representations of the corresponding anatomical portion image, so that higher order matching may be obtained for a smooth transition. For example, if the anatomical image portion is a head, and the corresponding anatomical image portion is a neck and torso, the base of the head may be "morphed" so that the outline of the superposed image is smooth. Likewise, colors may be altered or gradiented so that the hue and brightness have a smooth transition or match. Other types of higher order transition matching may also be effected.

Where the image is to be printed on a sheet, the characteristics of the corresponding anatomical portion image are generally known, and the printed image is scaled according to the known characteristics of the corresponding anatomical portion image. The scaled images are also positioned so as to be printed within predetermined confines of the sheet, such as within die cut portions.

In one embodiment, a dye sublimation printer is employed to print an image on a plastic sheet, which is then die cut around the images according to a predetermined pattern. The plastic sheet has adherence characteristics which allow it to adhere to, be repositioned and removed from other objects, such as plastic or plastic sheets, glass, smooth metal, or other surfaces. The printing process causes the image to diffuse into the plastic sheet, forming a permanent and durable image. The image may also be formed by ink-jet printing (using an ink which is compatible with the recording medium), thermal transfer printing or laser-type (toner particle) printing.

In the case of video image streams, the resulting image is preferably output to a video recording device and/or displayed on a video monitor.

In a video stream embodiment of the invention, audio information may be included within the process, with a customized portion associated with the anatomical portion image, which is in this case a foreground image, and a stock portion associated with the corresponding anatomical portion image, which is in this case a background image. In this way, the audio portion may be customized with relatively few insertions. A set of audio representations associated with the background image is used to determine the timing and optionally characteristics of information from the foreground image-associated audio information in a resulting soundtrack created by merging both streams of audio information.

The audio information associated with the foreground image may be, e.g., a name, spoken in various intonations, associated with the customized image information. The audio information associated with the background image may be, e.g., a story associated with a sequence of background images (regardless of the foreground image), with the set of audio identifiers relating to the timing and intonation of the name to be inserted in the soundtrack.

For a full understanding of the present invention, reference should now be made to the following detailed description of the preferred embodiments of the invention as illustrated in the accompanying drawings.

BRIEF DESCRIPTION OF THE DRAWINGS

FIG. 12 including

FIGS. 16A–16E is a top view of a die cut sheet having printed head portions of an individual scales in various sizes; and.

DESCRIPTION OF THE PREFERRED EMBODIMENTS

Figure 1:
FIG. 1 is a diagram showing one frame of an image in which a boy's head is superimposed upon a hand-drawn boy's body.

The preferred embodiments of the present invention will now be described with reference to FIGS. 1–17. Identical elements in the various figures are designated with the same reference numerals.

FIG. 1 illustrates a typical electronically displayed image frame wherein the head 10 of a male child is superimposed upon a hand-drawn body 12. As may be seen, the head and body are in the proper relative proportions and the head is disposed upon the body at the proper location. This is the type of composite image results from the method and apparatus according to the present invention. In some embodiments, this composite is automatically produced, while in others, a person manually forms the composite image.

Figure 2:
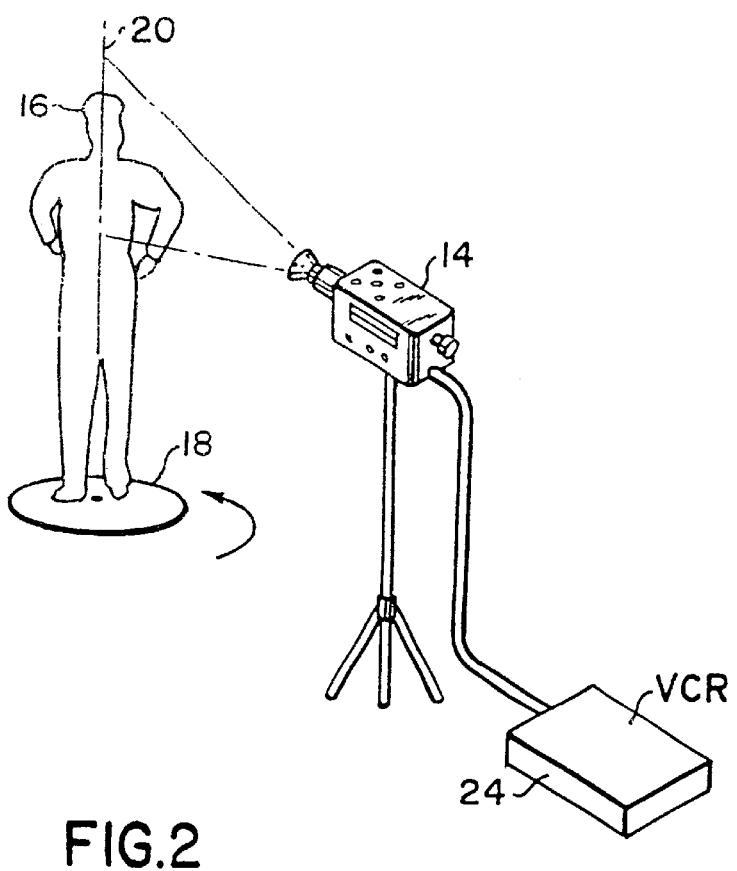
FIG. 2 is a perspective view showing how the head of a human subject, in various angular positions, which is electronically scanned to produce a plurality of electronic images.

FIG. 2 illustrates how the head of a human subject can be scanned by an electronic scanner to form stored images. In this case, a video camera 14 is arranged to view the head 16 of the human subject. This human subject stands on a platform 18 which is rotated about a vertical axis 20. In this way, a plurality of video frames are obtained, each containing the image of the head 16 in a different angular position. These video frames are stored on a video cassette recorder (VCR) 24. The stored video frames may be thereafter digitized, in an analog-to-digital converter, to provide digital representations of each frame.

Alternatively, the video frames containing the image of a human head can be obtained from a photograph of the human subject. For example, a Hewlett-Packard ScanJet® scanner may be employed to electronically scan a photograph and produce digital representations defining an image frame. Perspective views of the subject may be artificially generated from one or more views of the subject, by processing the electronically stored image based on a model of a human subject's head.

In order to provide special effects, the stored image may be "morphed" with another image for display. The process of "morphing" involves interpolating between two corresponding images, with preservation of continuity between corresponding features, i.e., edges, eyes, nose, mouth, neck, hair, etc. This allows, for example, a more natural placement and posture of a human head on an animal or other type body, and assists in animating the human head according to a predetermined choreography.

EXAMPLE 1

Figure 3:
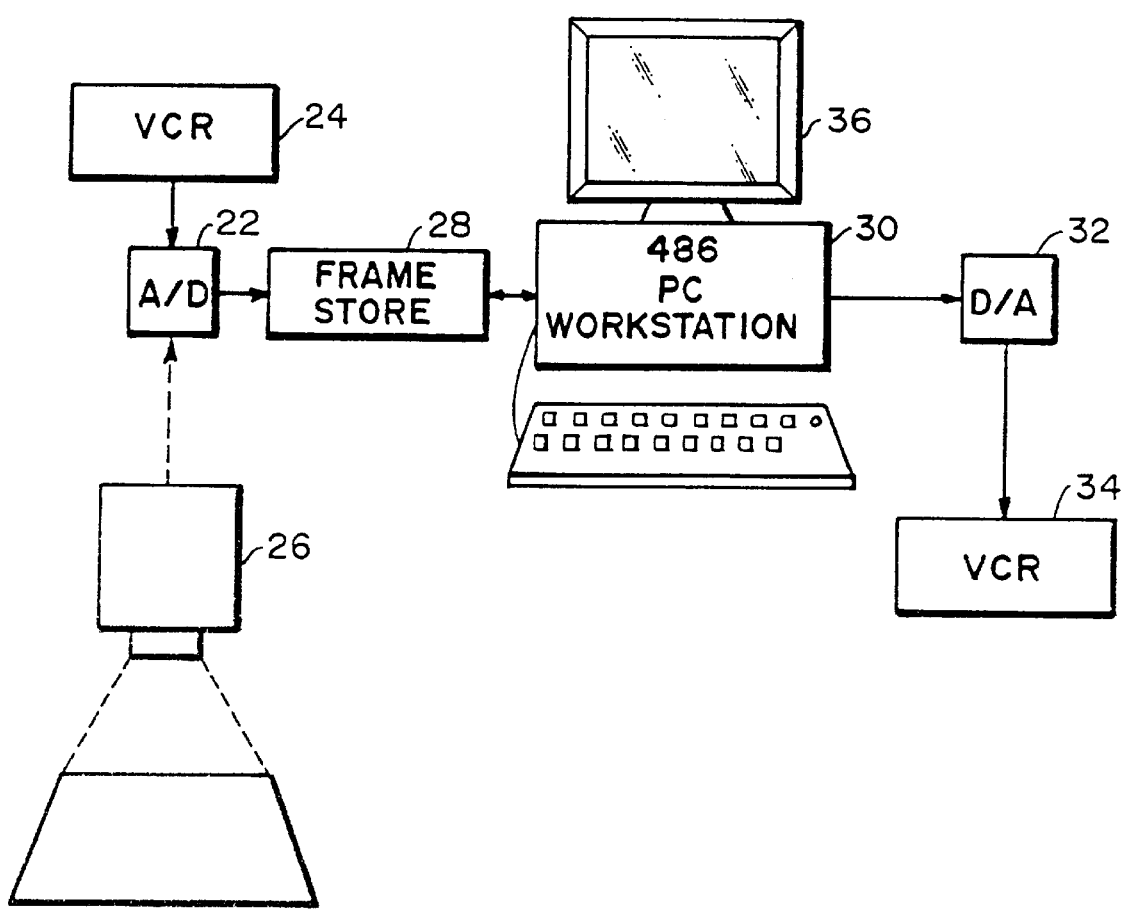
FIG. 3 is a block diagram of an electronic system employed, according to the present invention, to produce electronic images of the type shown in FIG. 1.

FIG. 3 illustrates a first apparatus employed for implementing the image-making method according to the invention. As is shown there, the system comprises an analog-to-digital converter 22 which can receive video image frames from the video cassette recorder 24 or digitizes images in a flat bed scanner 26. The flat bed scanner 26, which may, for example, be a Hewlett Packard ScanJet® or Sony flat bed scanner, electronically scans an image, e.g., 8 2×11 inch hand drawn art work or an 8×10 inch photograph.

The digital representations of each image frame are supplied to a digital image frame store 28 which, in turn, is addressable by an IBM compatible 80486DX2/66 personal computer (PC) workstation 30. Of course, Intel Pentium®, Apple Power PC, or other processors are known which may be employed for image processing. Alternately, less general purpose systems may be used, such as Net PCs, Web TVs, video game consoles, set-top boxes, and the like may be employed. In the case of a general purpose computer, the frame store is preferably an IBM rewritable optical disk, although a magnetic disk, RAM or other type of memory may be used to store the image frames. The PC workstation 30 is provided with a video adapter, such as is available from Targa Systems, Inc. of East Berlin, Connecticut, USA, under model name "True Vision Targa Plus 64 Board" for displaying television images on the workstation CRT screen 36 from digital representations of such images.

In one embodiment, the background images are stored as MPEG-1 or MPEG-2 files, which are stored in compressed format and presented as necessary. The foreground image in this case may be merged after decompression, or merged in compressed format and subsequently decompressed. When merged in compressed format, the positioning of the foreground image is controlled by way of a motion compensation vector. Likewise, it is also possible to scale the foreground image using high level MPEG constructs, although it is preferred that the base scaling for a scene be performed on an uncompressed image, prior to compression. By using motion compensation vectors, it is possible to obtain smooth, frame-by-frame movements of the foreground image over the background image. By providing the composite image as a compressed standard format image, standard video output devices which natively support the compressed format may be used, allowing efficient storage and distribution of the data.

The image frames composed by the PC workstation 30 are supplied in digital form to a digital-to-analog converter 32 which, in turn, passes the analog signal to a VCR 34 or other video recording device.

In this embodiment, the PC workstation 30 operates with two applications programs namely, AVS 4000 and AVS 5000, which are also available from Targa Systems, Inc. These programs, which implement the method according to the present invention for automatically superimposing the head of a human subject on a body contained in an image frame, is described in detail in Example 2.

EXAMPLE 2

Figure 4A:
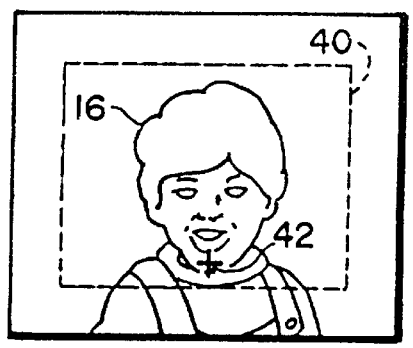
FIGS. 4a and 4b are image frames containing the head of a human subject in front and side views, respectively, as may be obtained with the apparatus of FIG. 2.
Figure 4B:
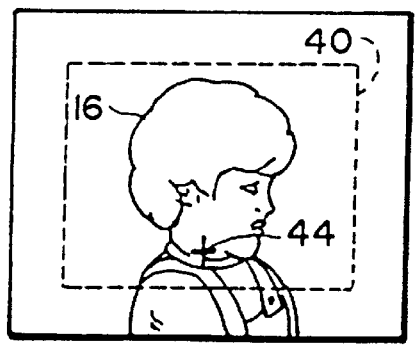

As shown in FIGS. 4a and 4b, the image of a human head is initially electronically scanned and then digitized, and a set of first digital representations defining a first image frame are stored in the frame store 28. The operator of the PC workstation 30 next displays the image of the head 16 on the workstation CRT screen 36 and selects a suitable frame size 40 for the image. In addition, the workstation operator selects a reference point on the first image frame 40 which indicates the location of the head with respect to the frame. This reference point is preferably a central point at the bottom of the chin, in the case of a full-face view, and a central point at the top of the neck in the case of a side view. These reference points are shown as points 42 and 44, respectively, in FIGS. 4a and 4b.

Figure 5A:
FIGS. 5a and 5b depict image frames in which the head of a human subject has been enlarged and reduced in scale, respectively.
Figure 5B:
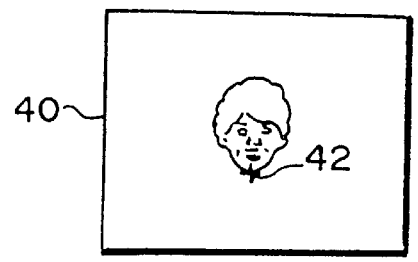
Figure 6:
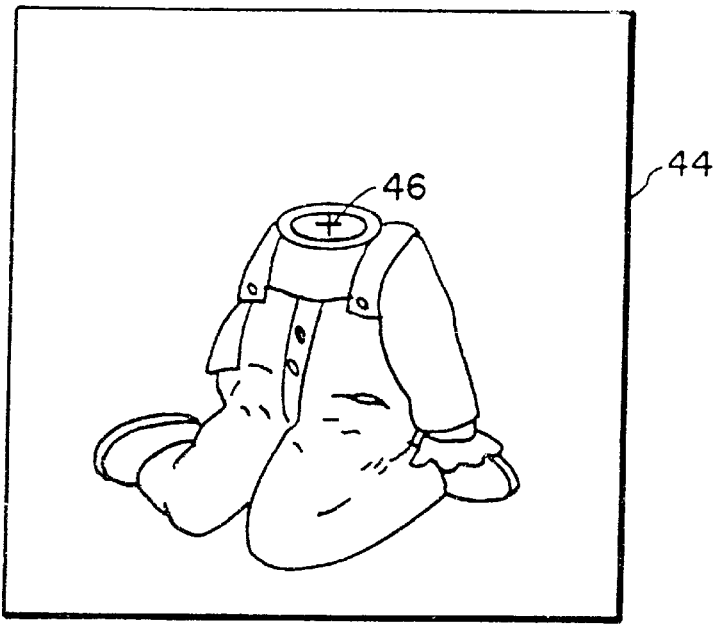
FIG. 6 depicts an image frame containing the body of a human subject, without a head.
Figure 7:
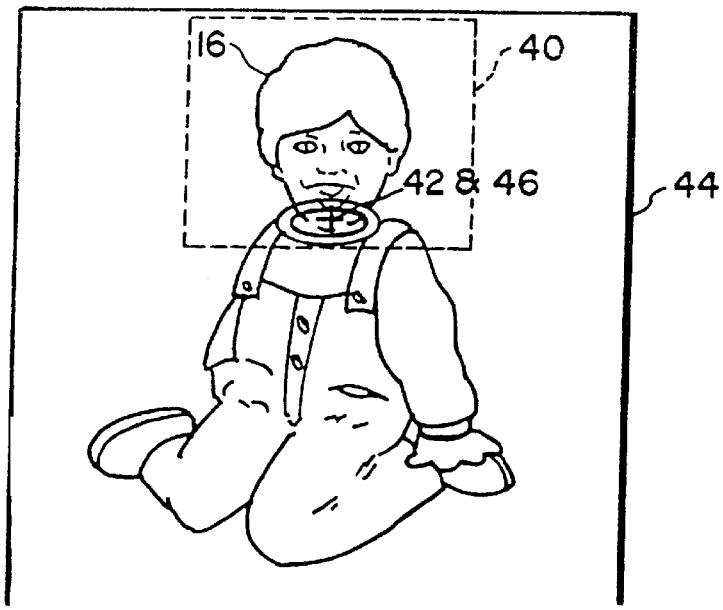
FIG. 7 depicts an image frame in which the head of a human subject has been superimposed upon the body shown in FIG. 6.

As a next step, the workstation operator causes the workstation to scale the image of the head, and produce and store digital representations of the head in a plurality of sizes, as shown in FIGS. 5a and 5b. Digital representations associated with each stored frame also define (1) the location of the reference point 42, indicating the location of the head on this frame, and (2) the size of the head in this first frame.

EXAMPLE 3

The scanned, extracted and scaled image of the head may then be merged with an image of a body.

Digital representations of a picture containing the body of the human subject are scanned, e.g., by the flatbed scanner 26, and entered into the frame store 28. The image frame containing this body is also displayed on the CRT display by the operator of the PC workstation. By observing the image, the operator produces a set of digital representations associated with this image frame defining (1) a reference point 46 on the frame 44 specifying the desired location of the head on this frame, (2) the desired size of the head on this frame 44.

Thereafter, the operator superimposes the image frame 40 containing the human head 16 in the desired size upon the image frame 44 with the reference point 42 superimposed upon the reference point 46.

Finally, the superimposed images, so generated, are output, for example supplied to a digital-to-analog converter which converts the image to a single frame in NTSC format which is then recorded on a VCR 34, or the image may be printed on a sheet.

EXAMPLE 4

Figure 8:
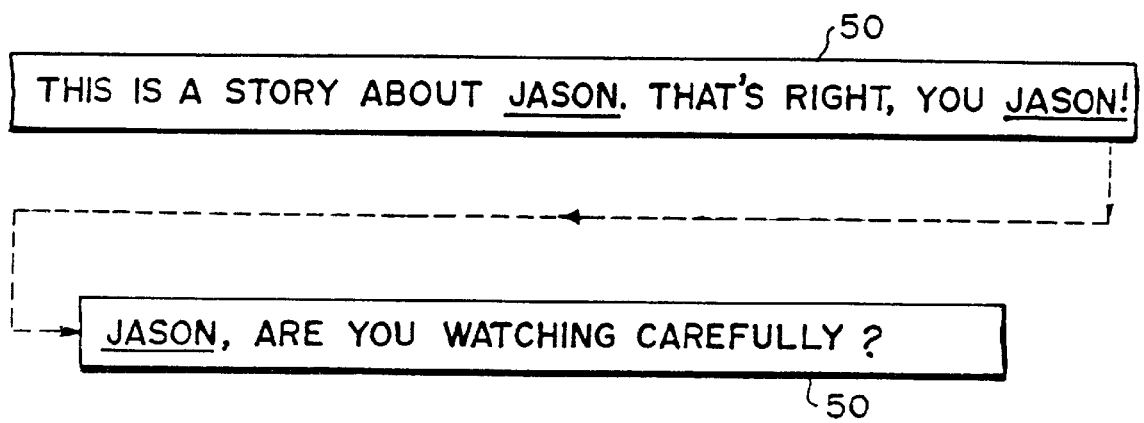
FIG. 8 is a representative diagram of a voice recording showing how the name of a person is inserted into a line of text.
Figure 9:
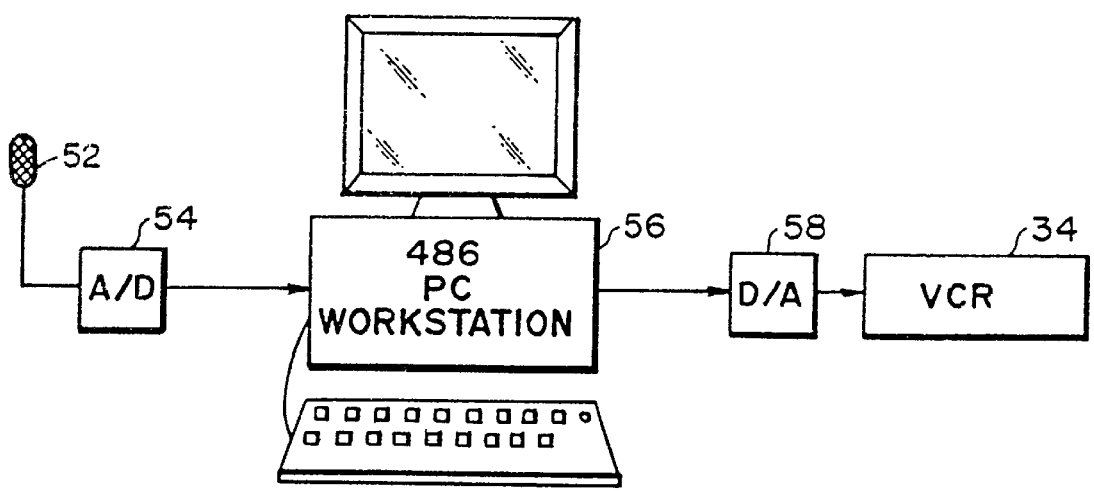
FIG. 9 is a block diagram of the an electronic system, according to the invention, for inserting the name of a person in a voice recording.

FIGS. 8 and 9 illustrate how a voice recording may be generated to provide a custom tailored soundtrack for a video recording. In this example, digital representations of the name of a human subject, "JASON", is inserted in a pre-recorded and digitized soundtrack.

FIG. 8 represents an excerpt from a magnetically recorded soundtrack 50. According to the present invention, the word "JASON" with the proper intonation, is inserted at the beginning and end of pre-recorded sentences.

FIG. 9 is a block diagram showing an apparatus for implementing the method. This system comprises a microphone 52, analog-to-digital converter 54, a PC computer workstation 56, a digital-to-analog converter 58 and the VCR 34. The PC workstation 56 contains an IBM audio capture and playback adapter with associated software.

The method of producing the voice recording of FIG. 8, with the aid of the apparatus of FIG. 9, will now be described.

Initially, the text of the voice recording, without the inserted name, is spoken into the microphone 52. This text is recorded in digital form on the hard disk memory of the PC workstation. Thereafter, the name of a human subject, e.g., "JASON", is spoken into the microphone 52 with three different intonations: declaratory, exclamatory and interrogatory. These sounds are also digitized and stored on the workstation hard disk.

Preferably, an entire library of names is so recorded on the workstation hard disk for later use. Of course, different names may be synthesized by a computer system based on the pronunciation of the name and a voice synthesis algorithm. The audio sound track may also be processed on an Apple Macintosh computer with sound capability.

When a video cassette recording is made, the text is automatically read and supplied via the digital-to-analog converter 58 to the VCR 34. Personal names, e.g., "JASON", with a proper intonation, are inserted in this text on the fly. If the name is to be added at the end of a sentence, digital representations thereof are added "flush left", i.e., with a variable length sound gap between the end of the sentence and the beginning of the next sentence; if it is to be inserted at the beginning of a sentence, the digital representations are added "flush right", i.e., with a variable length gap before the name, so that the sentence will sound "natural" in reproduction. The name may also be embedded in the sentence, with variable length gaps at pauses within or at the beginning and/or end of the sentence.

The audio may also be recorded, for example, into a semiconductor storage device, such as in compressed digital format in a electrically programmable read only memory device, e.g., a known EPROM or EEPROM device, or in an analog format in an analog storage device, such as is available from ISD. Thus, the audio may be provided in a portable electronic reproduction device to accompany a set of printed images.

EXAMPLE 5

Figure 10:
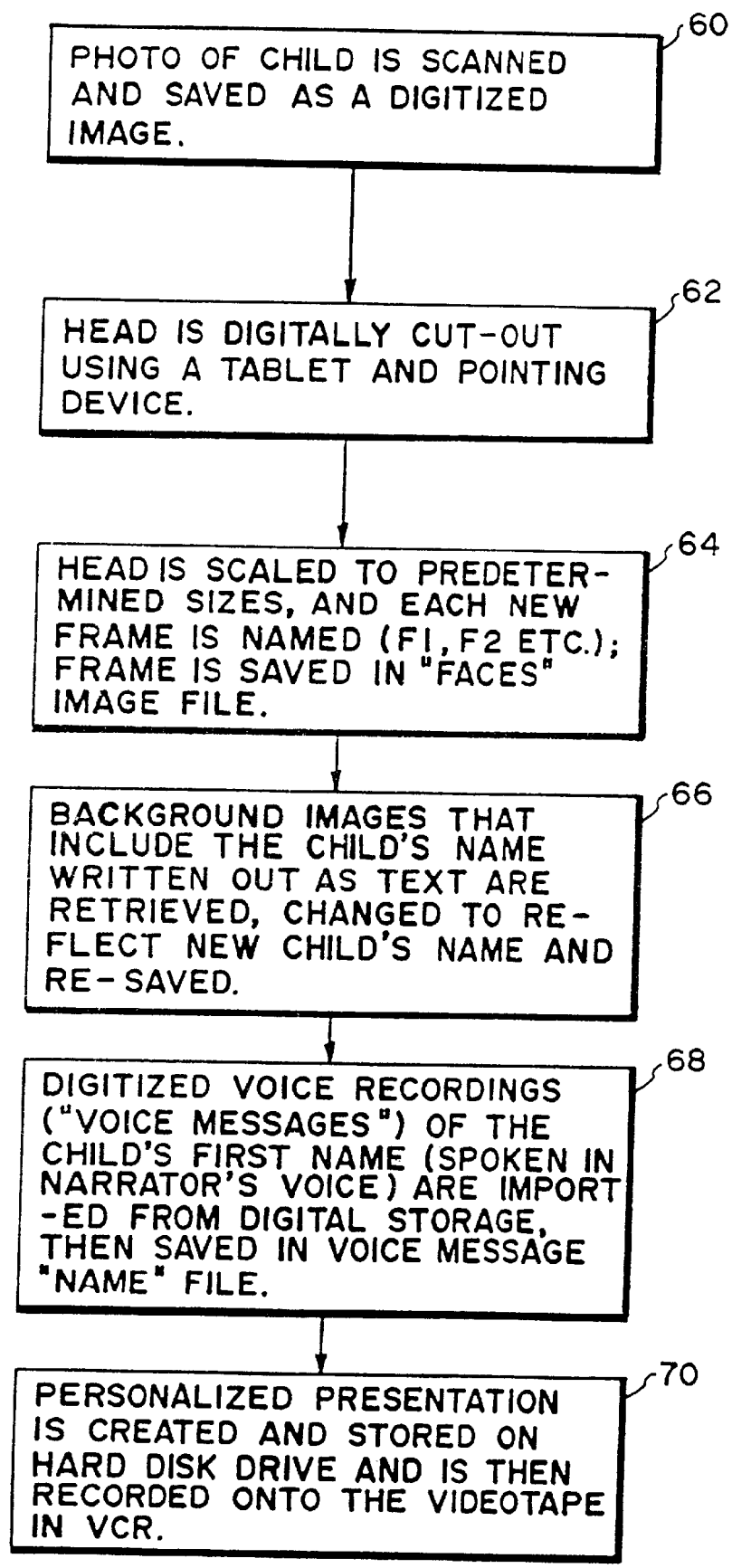
FIG. 10 is a flow chart of a computer program for implementing the electronic image producing process in the apparatus of FIG. 3.

As illustrated in FIG. 10, the video and audio "personalization processes", respectively, according to the invention are carried out as follows:

Video Personalization:

First, a photograph of a child (any size) which includes a child's head—e.g., in full face view—is scanned using a color video scanner. That digitized image is saved using the Targa AVS 5000 software on a 486 PC workstation. (Block 60).

After being saved, the image of the child's head is digitally "cut-out" using a computer tablet and the tablet's pointing device. The cutting-out is accomplished by tracing the edge of the child's head with a light pink line. This shade of pink has the ability to blend the edges of the child's head with the background colors in other illustrations or scenes ("background images"). (Block 62).

The cut-out head is saved after pink pixels are added to the corners of the image ("foreground image"). These pixels are added because the heads are ultimately justified against the background images according to the bottom left-hand corner of the foreground image, and the pixels in the corner prevent differently oriented and sized heads from being automatically positioned incorrectly relative to the position of the illustrated body in the background image.

Next, using the PC workstation, the scanned-in head is automatically scaled to up to 30 different sizes, from small to large, each of which is saved as an individual foreground image with a distinct name (F1, F2, F3, etc.) to produce a file called "Faces". The head is in some cases also flipped (mirror imaged) and/or rotated. (Block 64). Of course, with sufficiently powerful computing hardware, these images may be scaled "on-the-fly".

As a next step, using the PC workstation, the proper foreground image (F1, F2, F3, etc.) is retrieved from the file "Faces" and superimposed automatically upon the next successive background image of a video story (ABC1, ABC2, ABC3, etc.) at its proper location. Thereafter, the combined image is stored on a hard disk or directly to a video storage device, such as a VCR.

The first name of the person shown in the Faces file is written out as text and this text is inserted in those background images (ABC1, ABC2, etc.) that include the child's name. (Block 66).

The presentation ("story") is now recorded from the hard drive of the PC workstation to a videotape (or other possible media in the future). The story consists of a sequence of video and audio elements (images, voice messages, music) that are played in a predetermined order to create the story. In that sequence, the background images with the superimposed heads will appear in their predetermined places to create a personalized videotape. (Block 70).

Audio Personalization:

An audio file called "Names" is first produced, containing digitized recordings of the various names spoken by a voice artist. (Block 68). Of course, a computer synthesized voice may be used, especially if it is tuned to sound human.

When the presentation is created, the appropriate name is inserted at the predetermined point in the story. The name is "justified", either right or left, so that it will be naturally spoken in the context of the sentences in which it appears, with no unwanted pause between the name and preceding or subsequent words, or at other portions of the soundtrack, and so that the soundtrack remains in synchronization with the video sequence. (Block 70).

Figure 11:
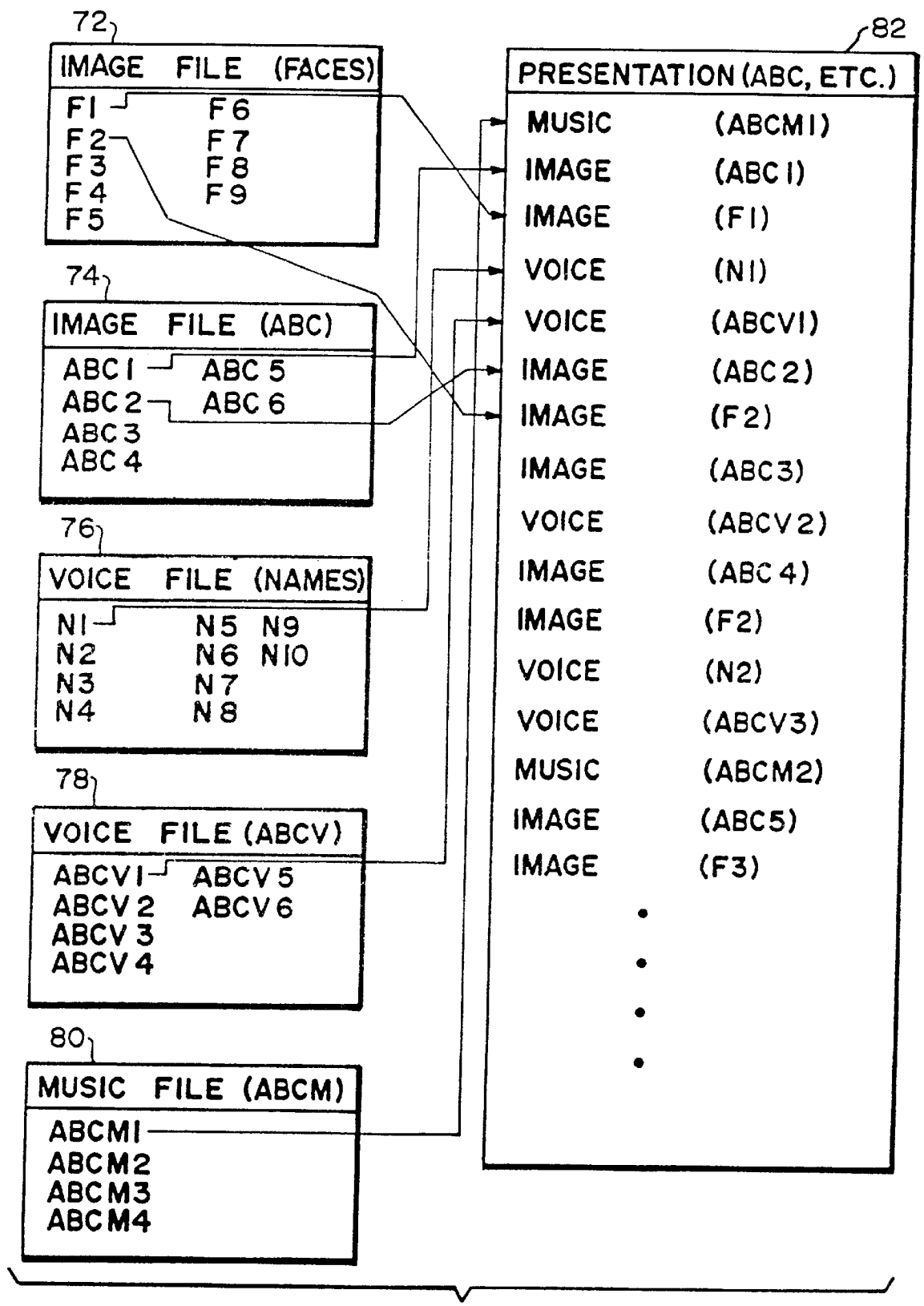
FIG. 11 is a flow chart of a computer program for implementing the audio recording process in the apparatus of FIG. 9.
Figure 12A:
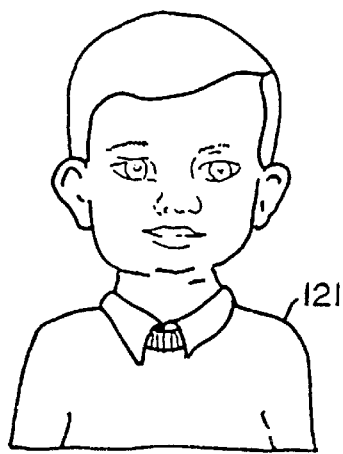
FIGS. 12A–12E is a graphical flow chart depicting the transformations according to the present invention.
Figure 12B:
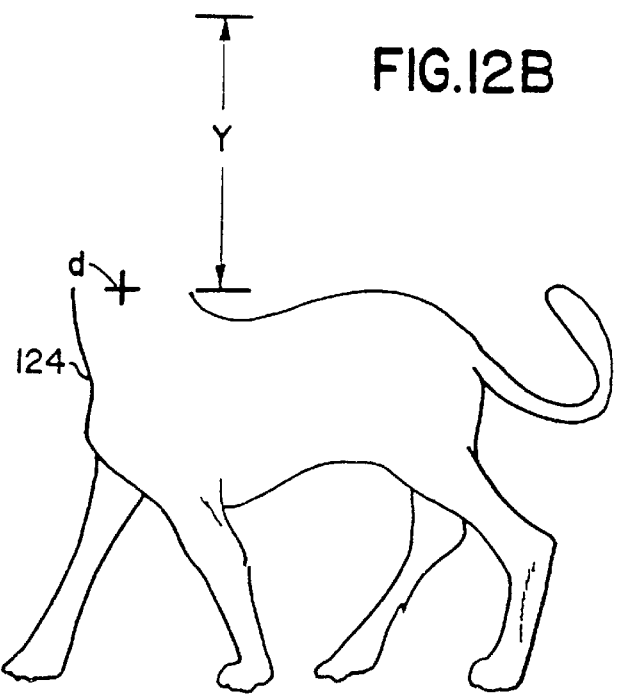
Figure 12C:
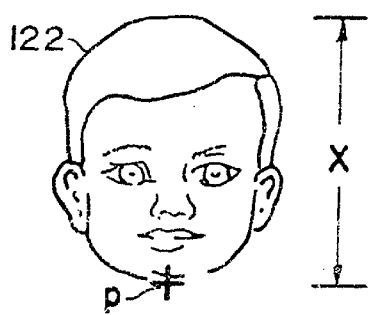
Figure 12D:
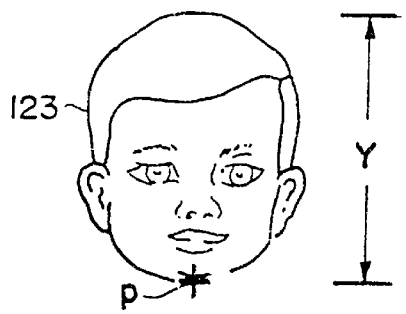
Figure 12E:
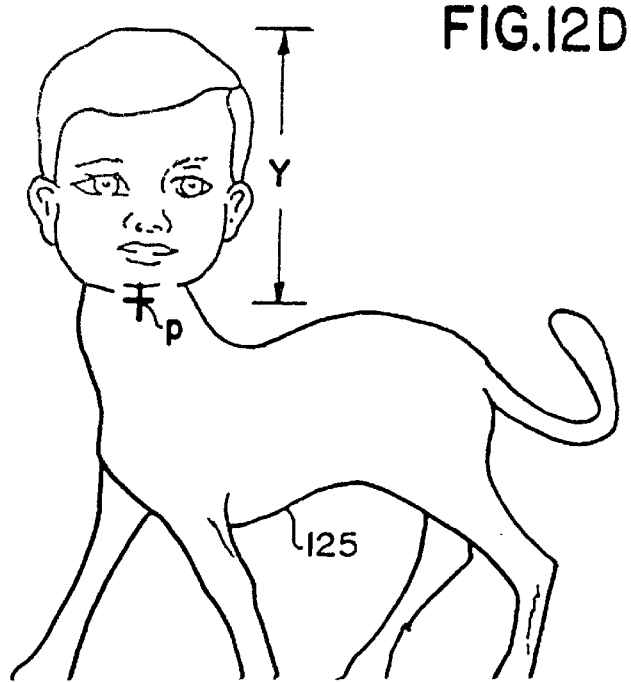
Figure 13A:
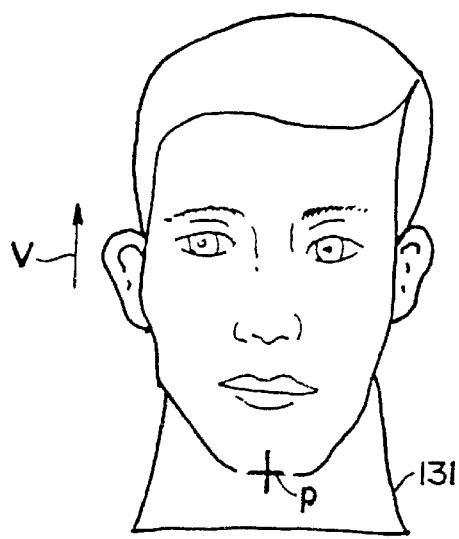
FIGS. 13A—13A depicts images having differing positioning.
Figure 13B:
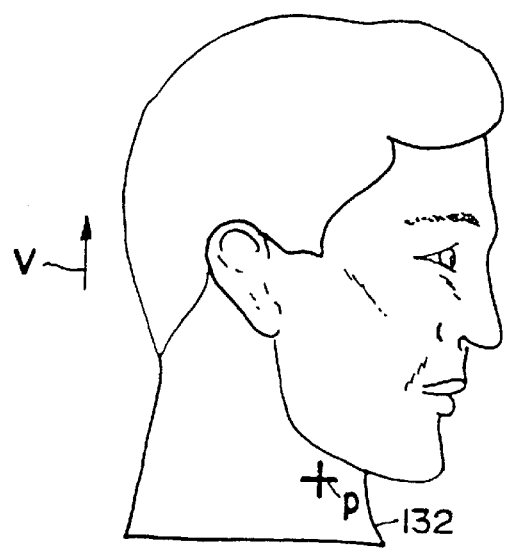
FIG. 13 including
Figure 13C:
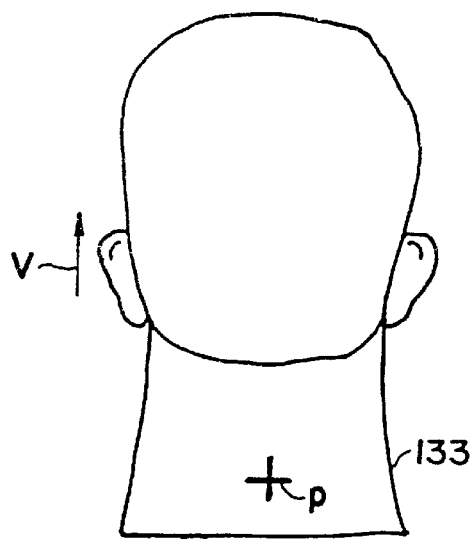
Figure 13D:
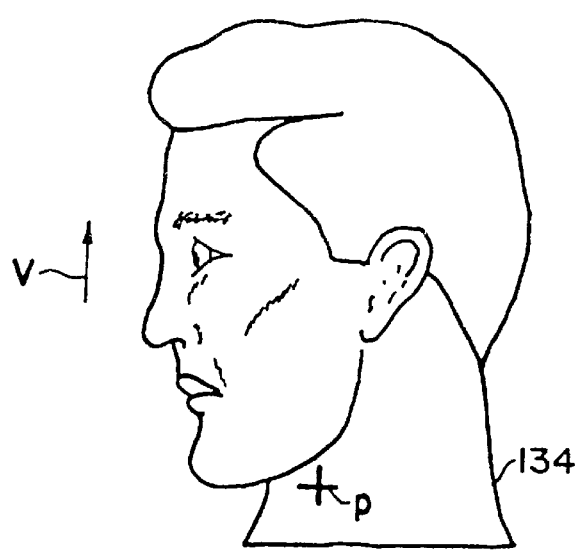
Figure 13E:
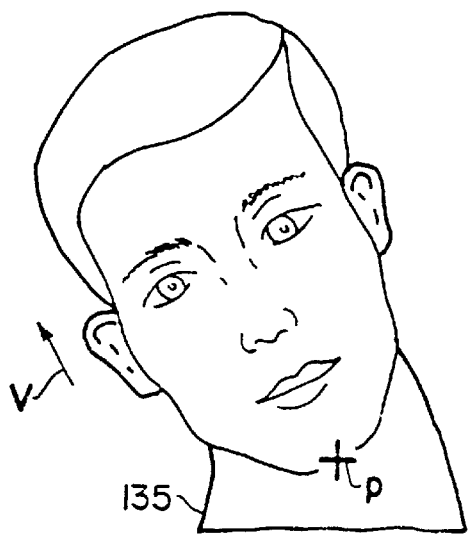
Figure 13F:
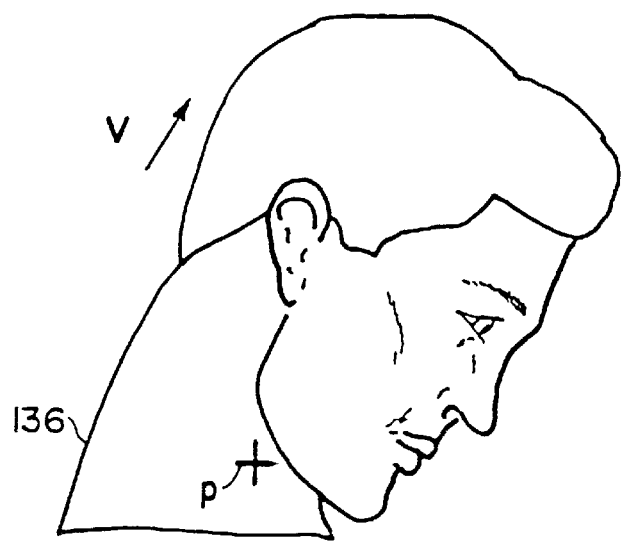
Figure 13G:
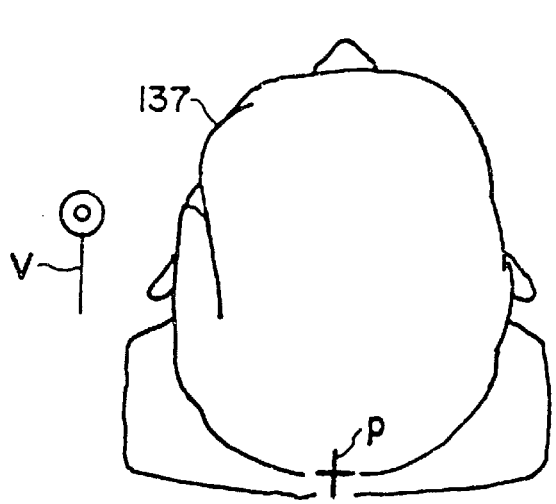
Figure 13H:
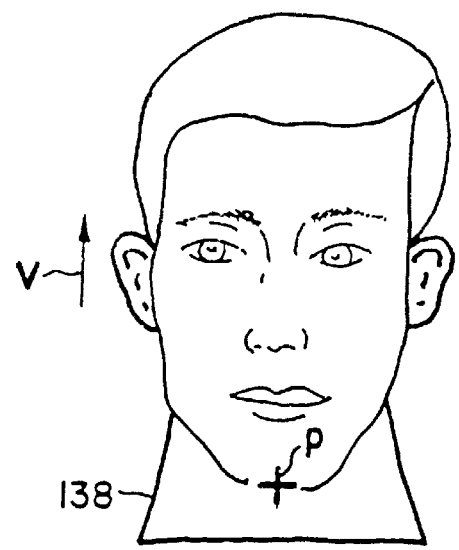
Figure 14:
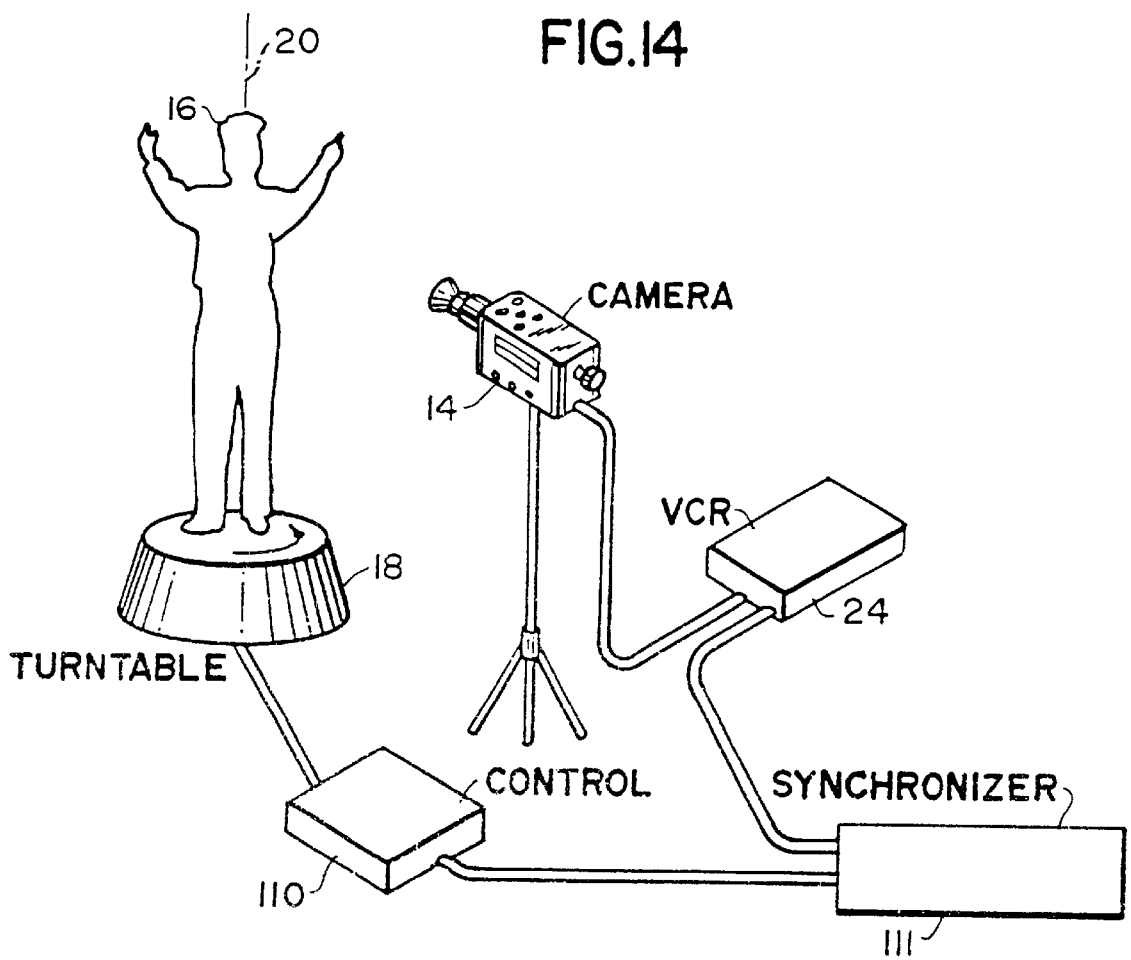
FIG. 14 is a semi-schematic view of an apparatus for obtaining customization information.
Figure 15:
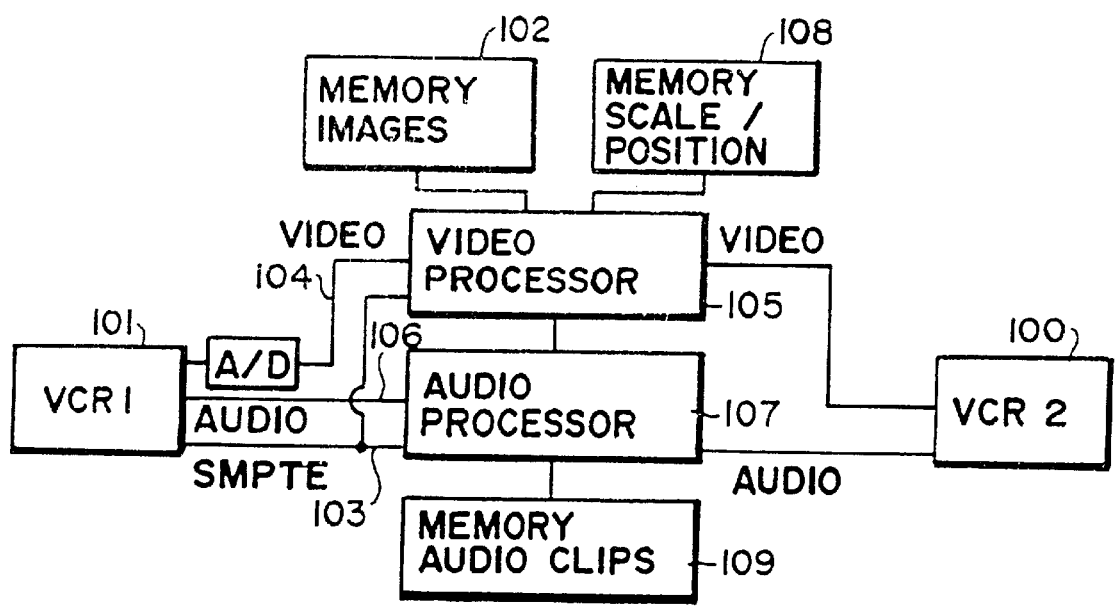
FIG. 15 is a block diagram of an embodiment according to the present invention.

FIG. 11 illustrates how the personalized presentation is created (Block 70) from the files of digital representations containing the foreground images ("Faces") 72, the background images ("ABC") 74, the voice file for "Names" ("N") 76, the voice file for narrative ("ABCV") 78 and the music file ("ABCM") 80. As explained above, the video presentation is created by superimposing the correct image of a head (F1, F2, F3, etc.) on successive background images ABC1, ABC2, ABC3, etc.

The audio presentation is created by superimposing digital representations of the names N1, N2, N3, etc. over the voice file ABCV1, ABCV2, ABCV3, etc. In addition, successive digital representations from the music file ABCM1, ABCM2, ABCM3, are supplied at proper intervals.

There results a presentation file 82 which is stored on the hard disk and then "played" through the digital-to-analog converter to a VCR to produce a videotape.

EXAMPLE 6

In contrast to the system described above, an alternative system is provided which allows the production to occur in real time and be synthesized, sequenced and directly recorded on a video tape 100 or other video recording device.

Thus, according to this embodiment, a source background video sequence may be provided on a master videotape, in a video tape player 101. In each frame, a foreground image is supplied from a library of images in memory 102, which may include images varying in perspective, size, action (e.g., mouth open, mouth closed, eyes open, eyes closed, smiling, frowning, etc.), lighting, or other characteristics. The image library may also be supplemented with synthesized images, which are interpolated or extrapolated from actual images.

The source background video sequence is coded with SMPTE time codes 103, and may also have other associated information. For example, a close-captioned signal may be included with the audio text, and information regarding the optimum location and orientation of the image. The source background video image 104 is fed to a 486 PC computer 105 with a modified Television Laboratories Director Turbo system video processor. This video processor allows the facial image to be scaled, rotated and placed in real time on the background video image. The sequence of foreground images is determined by a predetermined program keyed to the SMPTE time codes 103. Therefore, the processing of the foreground image proceeds in sequence, through a series of selections and transformations of the foreground image data.

The audio track 106 is processed by an Apple Macintosh computer 107. Based on a preprogrammed sequence the SMPTE time codes 103 from the background video sequence control the audio system. At selected chronological locations within the audio sequence, the name of the child is inserted, with the proper intonation and timing. Based on the linguistic relationship of the inserted name, which will have a variable duration, to the remainder of the audio track, which will have a fixed timing, gaps may be added or reduced to maintain the appropriate synchronization. If close caption signals are provided, these may be updated with the child's name as well.

The fixed audio track is preferably recorded on an audio tape, separate from the source background video signal, with only the variable portion, i.e., the child's name, provided by the Apple Macintosh. Of course, the entire audio sequence, including both the fixed and variable portions, may be provided by the audio subsystem, separate from the video source, especially where more complex variable portions are provided, wherein the final production is provided based on the SMPTE time codes, synchronizing the audio and video in the layback process.

The SMPTE code may be either a longitudinal time code (LTC) or a vertical interval time code (VITC), although the LTC is preferred.

The library of images, stored in memory 102, of the human subject as the foreground image may also be "morphed" with the background video image sequence, although this is not generally performed in real time, i.e. the background image cannot be directly transferred to the output videorecorder at about 30 frames per second, but rather at a much slower rate.

In the "morphing" process, the foreground human subject image, i.e., the facial image, is coded by hand or through an automated feature coding system, to separate the desired anatomical features from the remaining image components, and identify features, such as eyes, ears, nose, mouth, hair, and the like. The source background image is precoded for corresponding features. During production, frames are "morphed", especially in a manner which primarily preserves the characteristics of the foreground image for the primary facial features, and which preserves the background features at the edges and beyond, so that the resulting image of the human subject is an interpolation of a provided foreground image and a background image.

Further, the foreground image may be altered in expression, and, for example, lips from a still image may be made to appear to move.

EXAMPLE 7

The method according to Example 6 is implemented as follows:

First, an sequence of images of a human subject head is obtained by means of a video camera 14 or other electronic imaging system. These images differ in orientation and positioning, an a manner which is recorded in conjunction with the image. Therefore, a desired positioning and orientation for a cohesive match with the background image may be obtained by selecting the closest image actually obtained, which may then be further transformed by linear scaling, interpolation, or other processing. The subject stands on a turntable 18, which turns about axis 20. The rotation of the turntable 18 is controlled by a control 110, which is interfaced to a synchronizer 111, which also synchronizes a videotape recorder 24, which receives a signal from a videocamera 14, directed at the head 16 of the subject.

The human subject head is then separated from the remaining features either automatically or manually. For example, if the images are obtained in front of a blue screen, a chroma key unit may be used to provide a transparent margin for the foreground image. Alternatively, the edge of the head may be traced by an image processing algorithm to remove the remaining features. The separation may also be performed manually, as described above with respect to examples 1 and 2.

A unique positioning may be automatically determined for each image, e.g. 131–138, for example by determining a central axis v and a point p, i.e., the lowest portion of the face, the chin, as shown in FIG. 13. The size or scaling of the head may also be determined by measuring a distance from the bottom to top of the head, i.e., along the central axis, and relating this distance to a standard, as depicted in FIG. 12. In FIG. 12, a foreground image 121 is separated into a head portion 122. A point p is determined which defines a positioning of the head 122. The scaling of the head 122 is also determined by measuring a characteristic dimension x. The characteristic dimension x is related to a desired dimension y and the head rescaled to a new head image 123. The background image 124 defines a background, as well as a desired positioning d and the desired scaling. The scaled foreground image 123 is merged with the background image 124 by superposing the scaled head 123 with the defined point of the scaled head 123 coinciding with the desired positioning d.

The positioning and scaling may also be manually determined.

A background graphic sequence is provided, preferably on an SMPTE coded videotape. A corresponding file includes information relating the SMPTE codes with desired positioning and scaling of the foreground image. The background image is then fed to a video processor, e.g., the aforementioned Television Laboratories Director Turbo system, where it is digitized and temporarily stored in a frame buffer. The video processor receives a selected foreground image, which is then scaled and positioned in real time. The foreground image is overlayed on the background image and output from the video processor as an NTSC signal, which is recorded on a video recorder.

Simultaneously with the video processing, the SMPTE codes are used to determine an audio track. A constant audio track is provided in synchronization with the background video. The SMPTE codes are fed to a Macintosh computer, which is preprogrammed to relate the sequence of audio. At particular times, a variable audio portion, i.e., a name, is inserted in the audio track. The predetermined sequence also includes information regarding the placement of the variable portion within the allotted timespace. Thus, the variable audio may be placed at the beginning, end, or middle of the timespace. The variable audio portion and the fixed audio portion are then mixed and recorded with the composite video on the video cassette recorder.

Of course, it should be understood that sequences of video buffer frames may also be present around the time occurrence a variable speech portion. Therefore, the length of the gap between fixed audio portions may be varied by truncating frames or by providing interpolated frames in the variable time portion, so that variable length sound gaps need not occur.

EXAMPLE 8

Figure 16:
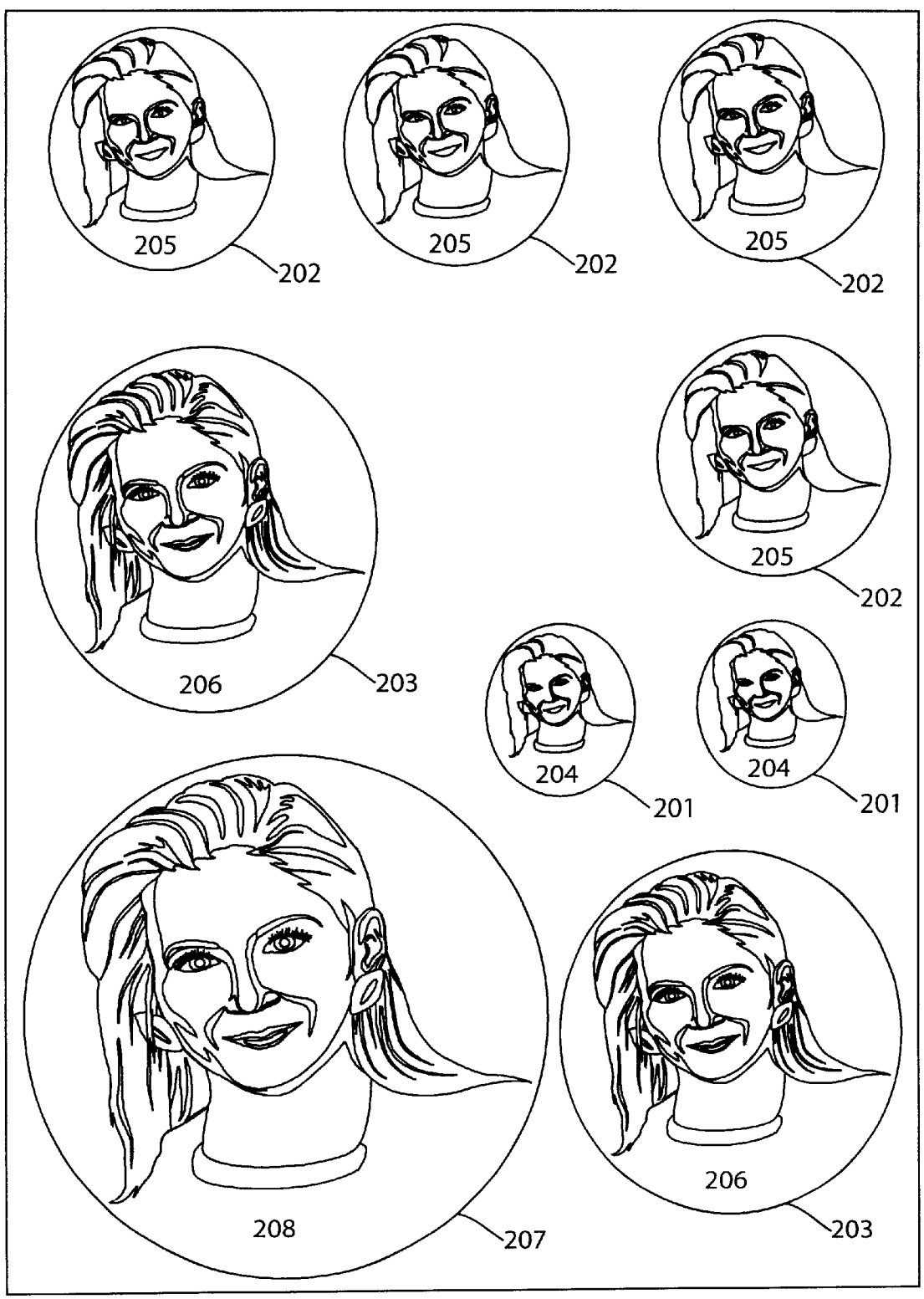
FIG. 16 including
Figure 16A:
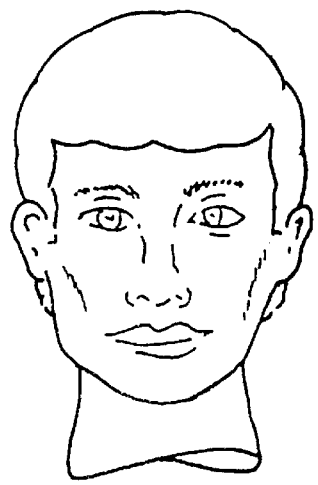
Figure 16B:
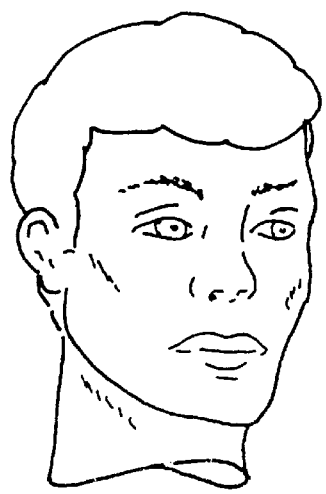
Figure 16C:
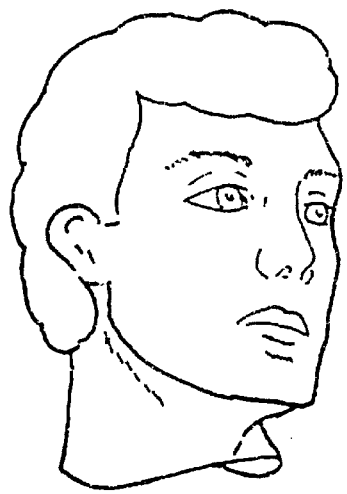
Figure 16D:
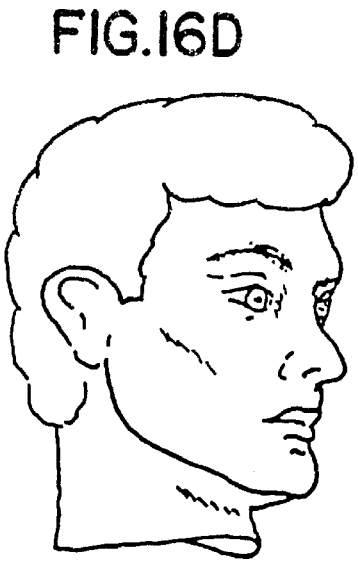
Figure 16E:
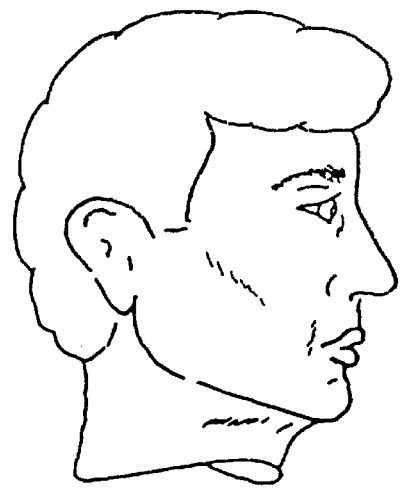

FIG. 16 shows a sheet of facial images 201, 202 and 203 produced in accordance with the present invention. The printed images are preferably provided in a number of sizes, e.g., small 201, medium 202 and large 203, each having a standardized margin 204, 205, 206 allowing placement of the custom printed images 201, 202, 203 on an appropriate generic background image. The generic background images are included, for example, in a preprinted book or pamphlet, having images which are designed to accept the custom printed images to yield a composite image with an aesthetically pleasing result, or a plastic sheet having a background pattern on which die cut portions including the custom printed images on the sheet may be temporarily positioned and removed. The preprinted pages may, for example, have codes or outlines printed in places where particular images are intended to be placed, simplifying the process of selecting and placing a custom image which corresponds to the preprinted image.

It is also possible to provide computer software and printable sheets for use with a home computer, allowing the user to make the sheets themselves.

Figure 17:
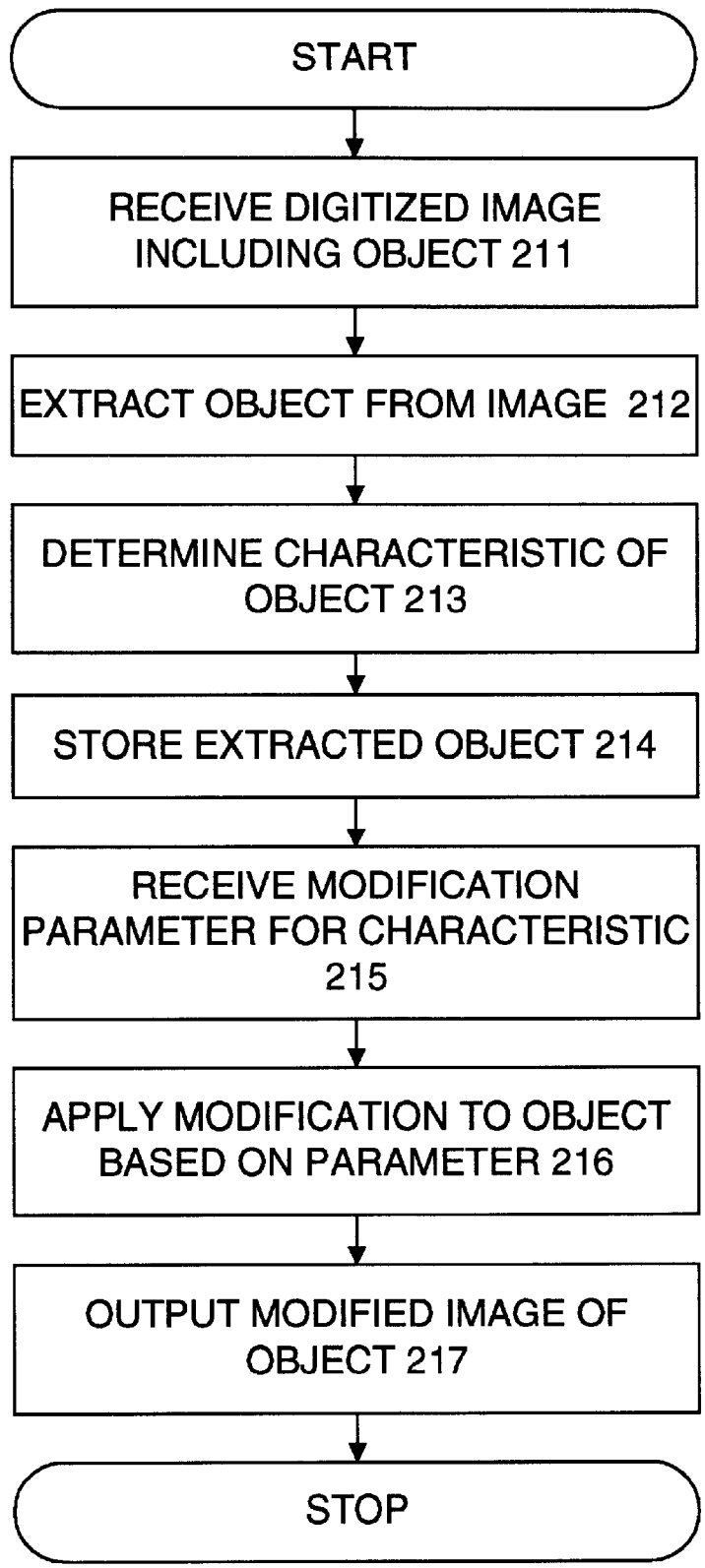
FIGS. 17 and 17A–17B are a flow chart and examples showing a method of forming images in accordance with the present invention.
Figure 17A:
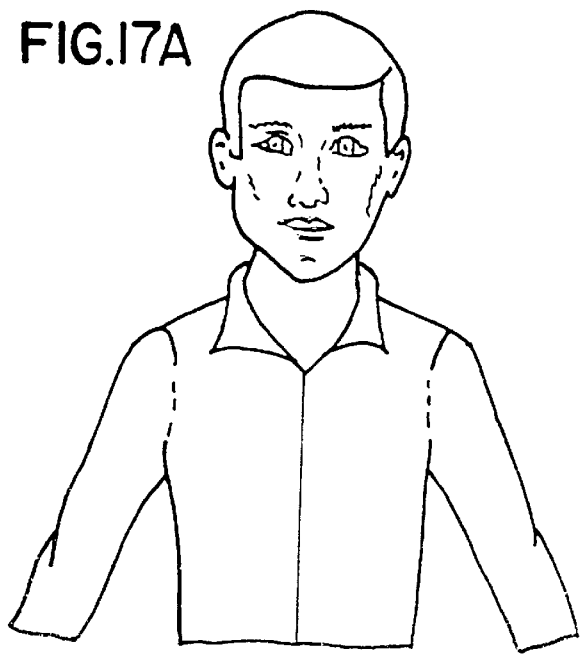
Figure 17A:
Figure 17B:
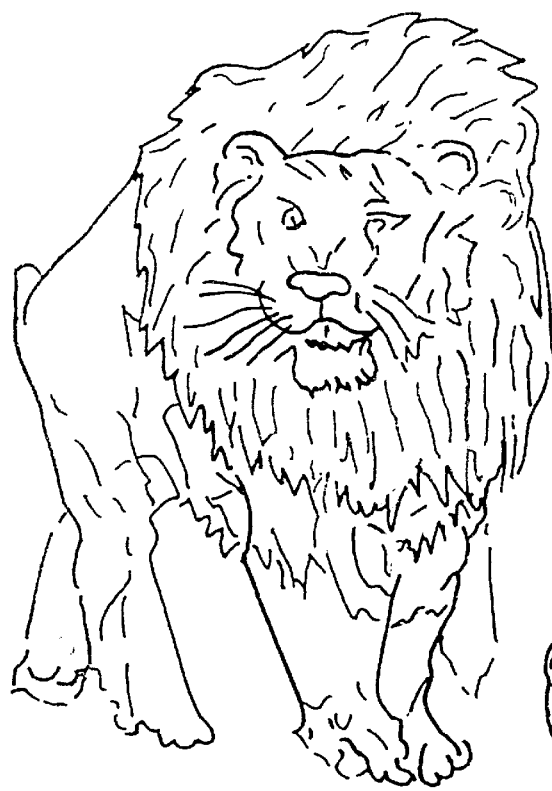
Figure 17C:
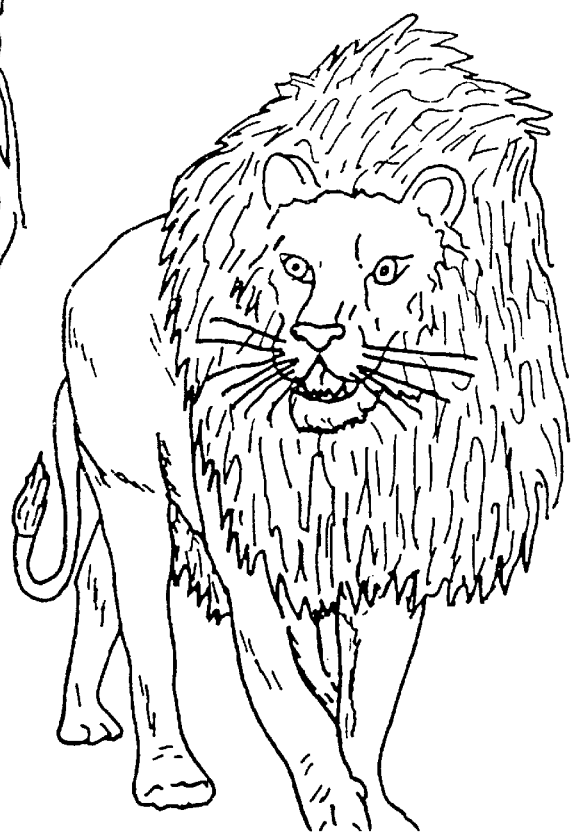

FIG. 17 shows a method in accordance with the present invention. A digitized image, including an object, is received by a processor 211. The object may be, for example, an anatomical feature, or portion thereof, of a person or animal, such as the head, eyes, face, hands, limbs, etc., or other type of object, such as a plant, tree, building, car, boat, etc. The object has at least one characteristic, which as discussed below, is determined. The digitized image is stored, at least temporarily, while further processing takes place, although the complete digitized image need not be stored permanently. The digitized image may be a single still frame, received from a scanned photograph or electronic camera, or a series of images, such as a video, digital video or cinema image stream.

The object is then extracted from the digitized image 212. This extraction may be manual or semiautomatic, directed by a user, who identifies the object or the margins of the object, or participates in a selection procedure which identifies the object in one or more frames. The extraction may also be highly automated, using logic and/or artificial intelligence to identify the object and extract it from the image. Where the digital image is a single frame, the object extraction may be a simple two-dimensional image analysis. However, where the digital image comprises a number of frames, separated in time and/or space, the object extraction is preferably a more complex three or four dimensional image analysis. Where the input stream is video data, a calculated motion vector component may advantageously be used to separate a foreground object from a background image. Pattern recognition techniques may also be used to extract the object. The extracted object may also include modeling data, relating to characteristics not directly apparent or present in the digitized image.

A characteristic of the object is then determined 213, based on the digitized image and/or the extracted object. For example, this characteristic may be a size, shape, scaling, rotation, translation, hue, brightness, gradient of hue or brightness, other color space characteristic, object identification, type, or the like.

The extracted object is stored 214, e.g., sufficient data is maintained in a persistent manner to allow reconstruction of the object or an image thereof at a later time.

The system is provided with a parameter for modifying the characteristic of the object 215. This parameter may be static or change for each object, and indeed there may be a plurality of parameters which may be applied individually or in groups, in one or more instances, to the object. Each parameter may be dimensionless, a simple vector or a more complex matrix.

The modification or modifications are then applied to the object, based on the parameter 216, to generate representations of one or more modified objects. Generally, the modified objects will be stored in memory for later processing or output, although the object may also be processed or rendered in real-time and not stored as such.

The modified image of the object is then output 217. The output device is generally a printer, such as an ink-jet, laser (toner based), dye sublimation, thermal transfer, or wax deposition printer, or an analog or digital electronic image output. Of course, the output may also be a computer aided manufacturing system to produce a relief or three dimensional object, a laser imaging system, a holographic imaging system, or other known type. In one embodiment, the image of the object is output onto a plastic film which is self-supporting, and has adhesion characteristics without the use of an added adhesive.

In this manner, customized image outputs may be automatically or semiautomatically produced from non-standardized input images.

There has thus been shown and described a novel method and apparatus for producing customized images which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. These images may be used by children or adults, and for novelty, business or educational purposes. All such changes, modifications, variations and other uses and applications which do not depart from the spirit and scope of the invention are deemed to be covered by the invention, which is to be limited only by the claims which follow.

What is claimed is:

1. A method of producing an electronic image of a subject, said method comprising the steps of:
   (a) providing an electronic representation of a pixel image of a head of said subject from an external source;
   (b) providing a background image containing a body configured to adjoin said head;
   (c) producing, from the electronic representation, a set of digital representations defining an actual size of said head in said electronic representation;
   (d) providing a set of digital representations defining a desired size of said head corresponding to said body;
   (e) processing said electronic representation of said image of said head in dependence upon the size information defined by said actual size and said desired size, representing said scanned image of said head scaled to said desired size; and
   (f) outputting said head, electronically rescaled to said desired size, superposed on said body.

2. The method according to claim 1, wherein said head has a reference vector and said body has a reference vector, further comprising the step of combining said head and said body to obtain a predetermined multidimensional relationship of the respective reference vectors of said head and said body.

3. The method according to claim 2, wherein said providing an electronic representation of an image of a head of a subject step includes the steps of obtaining store images of said head from a plurality of perspectives, thereby to produce a plurality of electronic representations, with each of said electronic representations representing said head in a different angular position with respect to a vertical axis; wherein said reference vector of said head comprises an orientation parameter.

4. The method according to claim 1, further comprising the step of defining a reference point of said electronic representation of said pixel image of said head of said subject, wherein said body has an associated reference point, further comprising the step of combining said head and said body to obtain a predetermined relationship of the respective reference points of said head and said body.

5. The method according to claim 4, wherein said head includes a chin and wherein said reference point of said head is located substantially on said chin.

6. The method according to claim 4, wherein said head includes a neck, and wherein said reference point is located substantially on said neck.

7. The method according to claim 1, further comprising the steps of:
   (g) providing a second image containing a second body configured to join said head;
   (h) providing a second set of digital representations defining a second desired size of said head corresponding to said body of said second image;
   (i) processing said electronic representation of said image of said head in dependence upon the size information defined by said actual size and said second desired size, representing scanned image of said head scaled to said second desired size; and (j) outputting said head, electronically rescaled to said second desired size, superposed on said body.

8. The method according to claim 1, wherein said outputting step comprises generating said processed electronic representation as a composite video image of said scanned image of said head scaled to said desired size.

9. The method according to claim 1, wherein colors in said image of said head are altered in correspondence to said colors of said drawing.

10. The method according to claim 1, wherein said body includes a collar immediately adjacent to a location of said superimposed head.

11. The method according to claim 1, further comprising the step of producing an audio recording associated with said processed electronic representation, said recording including a sequence of spoken words, having inserted therein a sound including a name of a person.

12. The method according to claim 1, further comprising the step of extracting positional information from said image of said head, and wherein said outputting step further comprises outputting said head having a positional predetermined relation to said body based on said positional information.

13. The method according to claim 1, further comprising the steps of:

(g) providing a plurality of images each having a representation of a body and a corresponding desired size of an associated head;

(h) processing said electronic representation of said image of said head a plurality of times in dependence on the size information defined by the actual size and the desired size relating to said plurality of representations of a body;

(i) extracting positional information from said image of said head; and (j) said outputting step comprising outputting, in a plurality of images, for each representation of a body, said processed electronic representation as an image of said head rescaled to said desired size and having a predetermined relation to said respective body based on said positional information.

14. The method according to claim 13, further comprising the step of associating with each of said plurality of output images, an audio stream, comprising a first portion associated with an identification of said head and a second portion associated with said body, said first and second portions having a predetermined temporal relationship.

15. The method according to claim 1, further comprising the step of associating said outputted image with an audio stream, said audio stream comprising a first portion associated with an identification of said head and a second portion associated with said body, said first and second portions having a predetermined temporal relationship.

16. A method of producing a composite electronic image of a subject comprising the steps of:

(a) obtaining a first image and extracting information relating to a head of a subject from the image, and producing a set of first representations of the first image;

(b) producing a set of size representations associated with the first image information defining an actual size of the head;

(c) providing a normalized size parameter associated with a body;

(d) digitally converting the set of first representations of the first image into a set of second representations, in dependence upon the normalized size parameter, the set of second representations defining the head rescaled to the desired size; and (e) outputting the head, anatomically superposed on said body, as image data.

17. The method according to claim 16, further comprising the step of associating with said outputted image an audio stream, comprising a first portion associated with an identity of said head of said subject and a second portion associated with said body, said first and second audio portions having a predetermined temporal relationship.

18. The method according to claim 16, further comprising the step of extracting positional information from said image of said head, and wherein said outputting step further comprises outputting said set of second representations in conjunction with said body and having a natural relation to said body based on said positional information.

19. A method of producing a composite image of a subject comprising the steps of:

(a) receiving a raster electronic image of a subject and extracting from the image an anatomical portion of the subject, from a remainder of the image;

(b) associating a reference with the extracted anatomical portion to define an anatomical location;

(c) determining a size of the extracted anatomical portion based on a determined actual size of the extracted anatomical portion;

(c) superimposing the extracted anatomical portion on top of a first predetermined image including an anatomically adjoining portion and a background graphic, to provide an anatomically correct juxtaposition of the anatomical portion with the anatomically adjoining portion overlying the background graphic, wherein the juxtaposition is based on the associated reference and the anatomical portion is normalized in size to the anatomically adjoining portion based on a first normalization parameter associated with the first predetermined image;

(d) outputting the juxtaposed anatomical portion with the first predetermined image as a composite image.

20. The method according to claim 19, wherein the anatomical portion is a head of the subject.

21. The method according to claim 19, further comprising the steps of:

superimposing the extracted anatomical portion on top of a second predetermined image, including an anatomically adjoining portion and a background graphic, to provide an anatomically correct juxtaposition of the anatomical portion with the anatomically adjoining portion overlying the background graphic, wherein the juxtaposition is based on the associated reference and the anatomical portion is normalized in size to the anatomically adjoining portion based on a second normalization parameter associated with the second predetermined image, wherein the first and second normalization parameters are different; and outputting the superimposed anatomical portion with the second predetermined image as a composite image.

22. The method according to claim 21, wherein said outputting step comprises printing the composite image on a recording medium.

23. The method according to claim 21, wherein said outputting step comprises generating the composite image as a video signal.

24. The method according to claim 21, further comprising the step of associating said outputted image with an audio stream, the audio stream comprising a first portion associated with an identification of the subject and a second portion associated with the first image, said first and second portions having a predetermined temporal relationship.

25. The method according to claim 21, wherein the first predetermined image comprises a buffer zone that visually obscures misalignment and visual artifacts from superimposition of the extracted anatomical portion.

26. A method of producing a composite electronic image of a subject comprising the steps of:
(a) obtaining a first image of a subject and separating information relating to a first anatomical portion of the subject from a remainder of the first image, and producing a set of first representations of the first anatomical portion of the subject;
(b) producing a set of digital representations associated with the first image, defining an actual size and anatomical orientation of the first anatomical portion;
(c) providing normalization parameters, the normalization parameters representing a size and anatomical positioning of a predetermined image, the predetermined image comprising an anatomically adjoining part;
(d) converting the set of first representations of the first image into a set of second representations, in dependence upon the normalization parameters and the set of digital representations, the set of second representations defining the first anatomical portion rescaled and reoriented to adjoin the anatomically adjoining part;
(e) superimposing the set of second representations into the predetermined image in anatomically correct juxtaposition with the anatomically adjoining part; and
(f) outputting the second representations superimposed on the predetermined image as image data.

27. A method of producing an electronic audio program, said method comprising the steps of:
(a) providing an electronic representation of a customizable audio program, having a set of predetermined insertion points and associated context;
(b) providing an electronic representation of a variable audio program portion from an external source;
(c) producing a set of digital representations defining a duration of the variable audio program;
(d) merging the customizable audio program and the variable audio program while time-justifying the variable audio program within the customizable audio program based on the predetermined insertion points and associated context, to produce a natural speech pattern; and
(e) outputting the merged audio program.

* * * * *